(12) United States Patent
Eskicioglu et al.

(10) Patent No.: US 8,332,657 B1
(45) Date of Patent: Dec. 11, 2012

(54) GLOBAL COPY PROTECTION SYSTEM FOR DIGITAL HOME NETWORKS

(75) Inventors: Ahmet Mursit Eskicioglu, Indianapolis, IN (US); David Emery Virag, Indianapolis, IN (US); David Jay Duffield, Indianapolis, IN (US); Michael Scott Deiss, Zionsville, IN (US); Billy Wesley Beyers, Jr., Carmel, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 09/936,415

(22) PCT Filed: Mar. 15, 2000

(86) PCT No.: PCT/US00/06834
§ 371 (c)(1),
(2), (4) Date: Feb. 1, 2002

(87) PCT Pub. No.: WO00/56068
PCT Pub. Date: Sep. 21, 2000

Related U.S. Application Data

(60) Provisional application No. 60/138,844, filed on Jun. 10, 1999, provisional application No. 60/124,480, filed on Mar. 15, 1999, provisional application No. 60/124,479, filed on Mar. 15, 1999.

(51) Int. Cl.
*H04L 29/06* (2006.01)
*H04L 9/00* (2006.01)
*G06F 12/14* (2006.01)
*G06F 11/30* (2006.01)

(52) U.S. Cl. ........ 713/193; 713/176; 713/184; 713/185; 713/186; 713/187; 726/27; 726/28; 726/29; 726/30

(58) Field of Classification Search .......... 380/200–202, 380/239, 9, 21; 713/176, 193
See application file for complete search history.

(56) References Cited

U.S. PATENT DOCUMENTS

| 5,420,866 | A | * | 5/1995 | Wasilewski | 370/426 |
|---|---|---|---|---|---|
| 5,481,609 | A | * | 1/1996 | Cohen et al. | 380/227 |
| 5,774,548 | A | * | 6/1998 | Bando et al. | 380/212 |
| 5,870,474 | A | * | 2/1999 | Wasilewski et al. | 380/211 |
| 5,948,136 | A | * | 9/1999 | Smyers | 710/107 |
| 6,178,242 | B1 | * | 1/2001 | Tsuria | 380/201 |
| 6,240,514 | B1 | | 5/2001 | Inoue et al. | |
| 6,674,858 | B1 | * | 1/2004 | Kimura et al. | 380/202 |
| 6,892,306 | B1 | * | 5/2005 | En-Seung et al. | 713/193 |

FOREIGN PATENT DOCUMENTS

| EP | 0763936 | | 3/1997 |
|---|---|---|---|
| EP | 0858184 | | 8/1998 |
| JP | 3-131139 | A | 6/1991 |
| JP | 10-178421 | A | 6/1998 |
| JP | 10-285210 | A | 10/1998 |
| WO | 98/21852 | A1 | 5/1998 |
| WO | WO-98/21852 | * | 5/1999 |

\* cited by examiner

*Primary Examiner* — Longbit Chai
(74) *Attorney, Agent, or Firm* — Robert D. Shedd; Paul P. Kiel

(57) ABSTRACT

A method for providing local security of audio and video content during transmission and storage within digital home networks. Scrambled content may be recorded in all conditions, however, only authorized copies are processed for descrambling and viewing. Content is protected within a network by rebundling the keys required for descrambling, e.g., the TDES keys, into a new ECM (LECM), which is protected by a local public key.

18 Claims, 5 Drawing Sheets

GLOBAL COPY PROTECTION SYSTEM FOR DIGITAL HOME NETWORKS

This application claims the benefit of U.S. provisional applications Ser. No. 60/124,479 filed Mar. 15, 1999; 60/124,480 filed Mar. 15, 1999 and 60/138,844 filed Jun. 10, 1999, which are hereby incorporated herein by reference, and which claims the benefit under 35 U.S.C. §365 of International Application PCT/US00/06834, filed Mar. 15, 2000, which was published in accordance with PCT Article 21(2) on Sep. 21, 2000 in English.

FIELD OF THE INVENTION

This invention provides local security of audio and video content during transmission and storage within digital home networks. Scrambled content may be recorded in all conditions, however, only authorized copies are processed for descrambling and viewing.

BACKGROUND OF THE INVENTION

Copyright owners and content creators, such as movie studios and production companies, have a need for protecting their investment, for example, movies, programming, services, software, or the like. Such content has typically found its way to the consumer through network broadcasts, premium programming cable or satellite channels, pay-per-view events, and retail sales and rentals of videocassettes.

Analog videocassette recorders (VCRs) allow consumers to view content at their convenience. Fortunately, such analog VCRs produce a reduction in quality of each generational recording that the second or third generation is usually unacceptable to most viewers. However, with digital technology, the intrinsic generational degradation characteristic of the analog technology no longer exists. The nature of digital storage and transmission allows endless generations of copies to be produced with the same quality as the original master. Today, most products that receive digital video services have only analog outputs. Future products with digital outputs will allow for the convenience of networked systems and higher quality recording. A home network, which receives content for display and storage, must now also protect content against illegal copying or distribution.

The Draft Video Home Recording Act of 1996 defines the Copy Generation Management System (CGMS) as a mechanism to manage the creation of copies, not the viewing of those copies. The rights of copyright owners do not map nicely into the concept of CGMS. Indeed, copyright owners have a greater interest in controlling the actual viewing of material as opposed to the copying of the material. Today, even using industry standard analog copy protection techniques, the emphasis is placed on the individual ability to view the copy. This is different from constraining the copying device from actually creating that copy.

These issues are exasperated due to the dramatic developments in digital media distribution such as the Internet. Therefore, there is a need to provide a secure solution for protecting the intellectual property of the copyright owners.

SUMMARY OF THE INVENTION

The present invention resides, in part, in recognition of the described problem and, in part, in providing a solution to above problems. Generally, the present invention provides a method for managing access to a scrambled program content.

The invention protects content within a network by rebundling the keys required for descrambling, e.g., the TDES keys, into a new ECM (known as an LECM). This method may comprise receiving a scrambled program (e.g., a scrambled data component and a descrambling key) in the first device, and rebundling the descrambling key using a unique key associated with the first device. The descrambling key is obtained from the rebundled descrambling key in a second device and used for descrambling the scrambled data component.

In accordance with one aspect of the present invention, the descrambling key is encrypted and the step of rebundling comprises decrypting the encrypted descrambling key using a key associated with the scrambled program and re-encrypting the descrambling key using a key associated with the first device to produce the rebundled descrambling key (i.e., LECM).

In accordance with another aspect, the present invention provides a method for managing access, within a network, to a scrambled program received from a service provider. The encrypted descrambling key associated with the scrambled program is decrypted in the access device using a key associated with the service provider and then the key is re-encrypted using a public key associated with said access device. The presentation device decrypts the re-encrypted descrambling key and descrambles the scrambled data component using the descrambling key. This invention may also be utilized for managing access to a scrambled pre-recorded program.

In accordance with yet another aspect, the present invention provides a method for recording a scrambled program received from a service provider. The method comprises receiving the scrambled program and decrypting the encrypted descrambling key in the access device, which in this case may be a video recording device, using a key associated with the service provider. The descrambling key is re-encrypted using a public key associated with the access device. The recording device records the scrambled data component and the re-encrypted descrambling key on media coupled to the recording device.

Figure 1A:
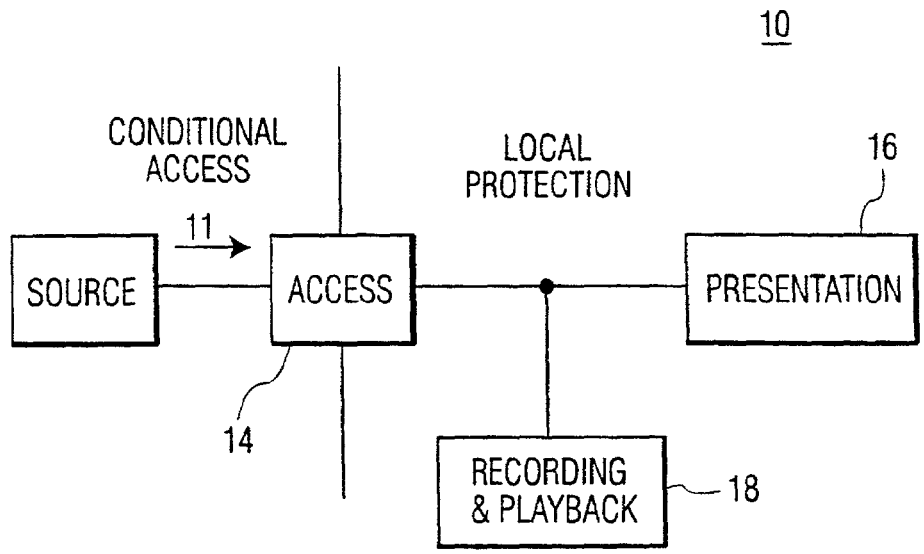
FIGS. 1*a* and 1*b* are system block diagrams of the XCA architecture in accordance with the present invention.

Where applicable, the same element numbers were used throughout these figures.

DETAILED DESCRIPTION OF THE DRAWINGS

A global protection system for digital home networks, also known as extended conditional access, or XCA, is defined in this application. XCA is a replaceable copy protection system designed to be used with renewable security devices such as smart cards. The Consumer Electronics Manufacturers Association (CEMA) has established 3 standards for interconnecting a digital television with other devices; (1) EIA-775—Digital Television 1394 Interface; (2) EIA-761—8-VSB Remodulator Interface; and (3) EIA-762—16 VSB Remodulator Interface. EIA-761 and EIA-762 are one-way transmission interfaces while EIA-775 supports bi-directional communications. Although XCA can be successfully employed with any of these interconnection standards, it is not limited to these three standards.

The flow of information is primarily one-way in an XCA system. Content flows from the source to the display maintaining its original scrambling. Because the content is chain protected instead of link protected, there is no need for consecutive links to negotiate or establish keys. All information flows strictly from the source device to the sink device, that is, always toward the presentation device (typically a digital television (DTV) or set-top box in combination with a television) for final viewing.

The following definitions are used to describe the present invention. Encryption or scrambling is the process of transforming plaintext into ciphertext (i.e., $E_{c,k}[M]$; the message M is encrypted with cipher algorithm C using key K); decryption or descrambling is the reverse process. Conventionally, encryption and decryption are used when discussing control words or keys, and scrambling and descrambling are used when discussing audio/video content. A control word (CW) is the key used to scramble and descramble audio/video content. A cryptosystem is a system for achieving confidentiality, an information security objective.

In a symmetric cryptosystem, the encryption and decryption keys are the same or can easily be determined from each other. In an asymmetric or public key cryptosystem, the encryption and decryption keys differ in such a way that at least one key is computationally difficult to determine from the other. Although the two keys are mathematically related, it is not possible to derive the private key with reasonable computational resources. As described below in further detail, each access device contains a unique public key for the purposes of locally encrypting the descrambling keys (LECMs). This unique public key is either stored in the access device during manufacturing or sent from a conditional access (CA) server when the access device is initialized in the field. During initialization, as described below in further detail, the access device may contact the CA server to obtain the unique public key using the identification of the access device.

Particularly, XCA protects the digital MPEG-2, or equivalent, encoded audio/video (A/V) content during transmission and storage. This is accomplished by mapping the three basic controls, namely, "playback control", "record control" and "one-generational control" into "viewing control". With XCA, content of economic value is always scrambled, either under the control and responsibility of the distributor or within the confines of the consumer's home network. The recording of scrambled content is always permitted in all conditions, however, only authorized copies are processed for descrambling and viewing in licensed devices.

XCA addresses the two critical elements for viewing control: time and space. Viewing control over time provides a mechanism to regulate when content can be viewed today or in the future. Viewing control over space regulates where and who may view this material. Together, these domains span a complete viewing space giving the copyright owner full controls over how content should be distributed and used.

XCA provides for three levels of entitlements. First, content that is free to distribute in an unlimited fashion is "free-copy" content. Examples of "free-copy" content may be broadcast television, infomercials or similar material that is supported by advertisers. Local View Programming, or "copy-once" content, provides a single household the ability to create and view a copy regardless of time. However, such a copy cannot be transported to other local networks because an LECM generated in one network cannot be decrypted in another local network. Examples of this type of content may be sporting events or premium services. Finally, "never-copy" or Immediate View Programming content allows for only the real-time viewing, i.e., recorded copies will never be viewable. Examples of this type of content may be pay-per-view programming or other high-value content.

Figure 1B:
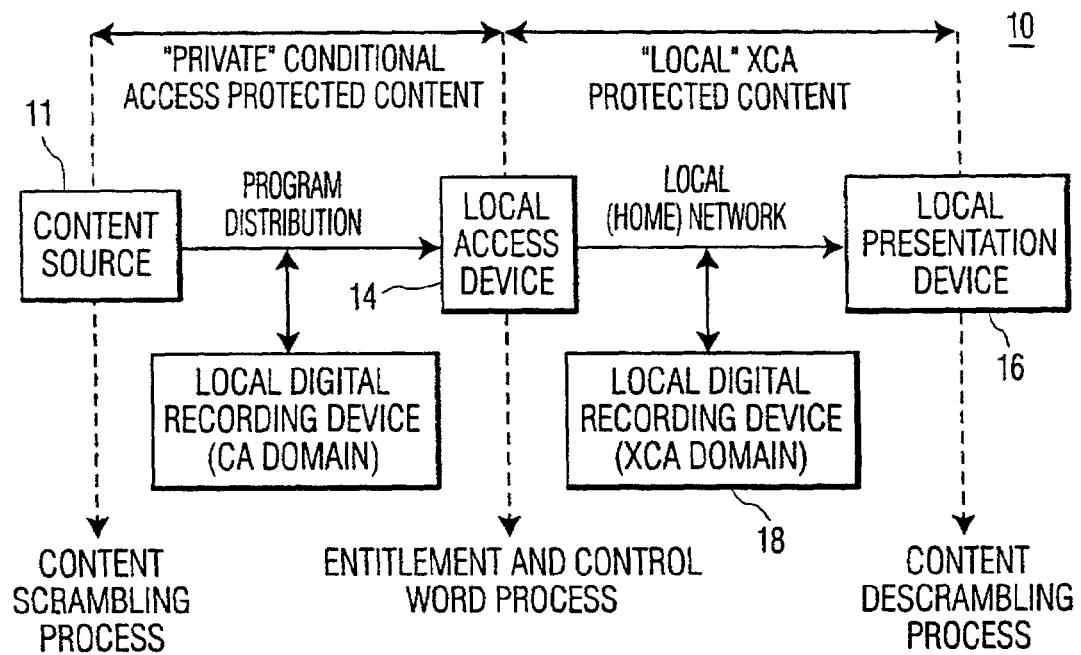

FIGS. 1a and 1b illustrate a distinct characteristic of the XCA architecture 10, that is, the notion of conditional access and local protection. Content of economic value 11 whether from a tape, DVD, cable, satellite or terrestrial broadcast is usually delivered via a private conditional access service. The audio/video content and keys are protected and supplied to all the subscribers of the service using a private conditional access architecture. Subscribers who purchase content are supplied with the necessary keys for descrambling the content. Access device 14, for example a set-top box, usually in conjunction with a smart card, obtains or generates the keys for descrambling the video content. In the XCA architecture, this is the process of conditional access. Local protection is the protection of the content within the boundaries of the home network, after the access device receives the scrambled program from the service provider.

Figure 2:
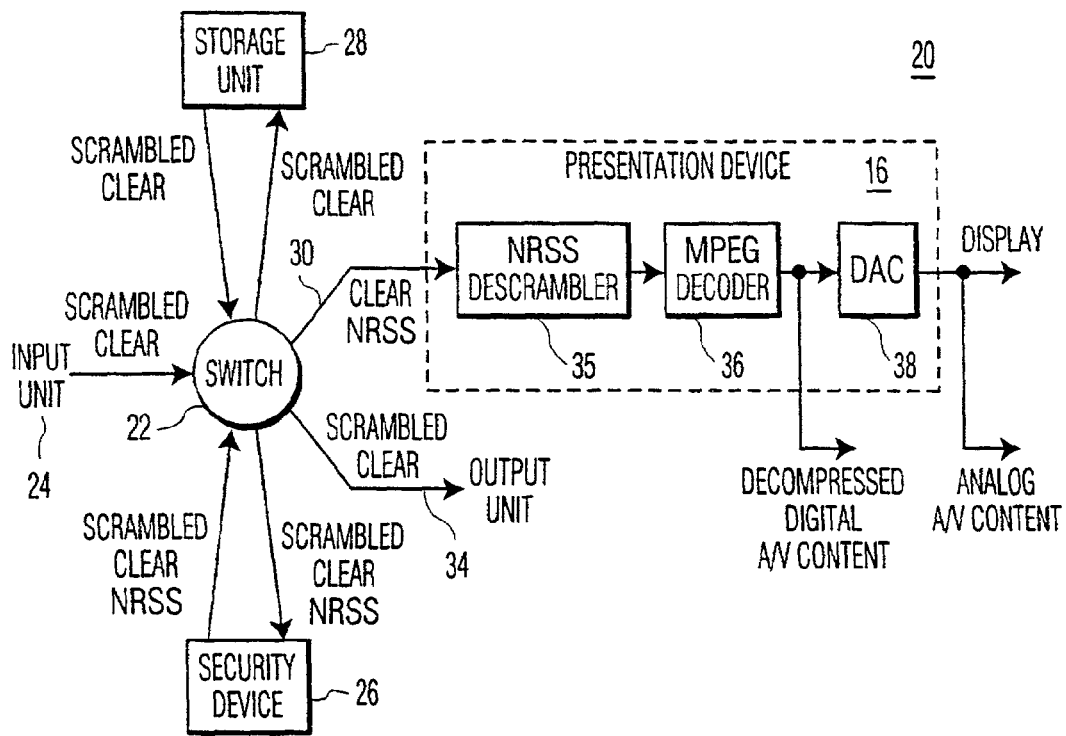
FIG. 2 is a block diagram of a generic XCA device employed in the XCA architecture of FIG. 1.

In general, a consumer electronic (CE) device 20 ("XCA device") employed within XCA architecture 10 is defined in FIG. 2. Such a device has, at a minimum, a switching unit 22 and a digital input 24. Depending on the device type, it may also contain one or more of the following elements; a security device 26 (typically renewable), storage unit 28, an analog output 30 and/or a digital output 34. Certain device types are defined with specific functionality, for example, (1) XCA Access Device 14 (e.g., set-top box, DVD player, DTV) creates "XCA protected content", (2) XCA Presentation Device 16 (e.g., DTV) descrambles "XCA protected content", (3) XCA Recording Device 18 (e.g., DVHS or DVD recorder) only stores or plays but cannot create or descramble "XCA protected bit streams".

Figure 5:
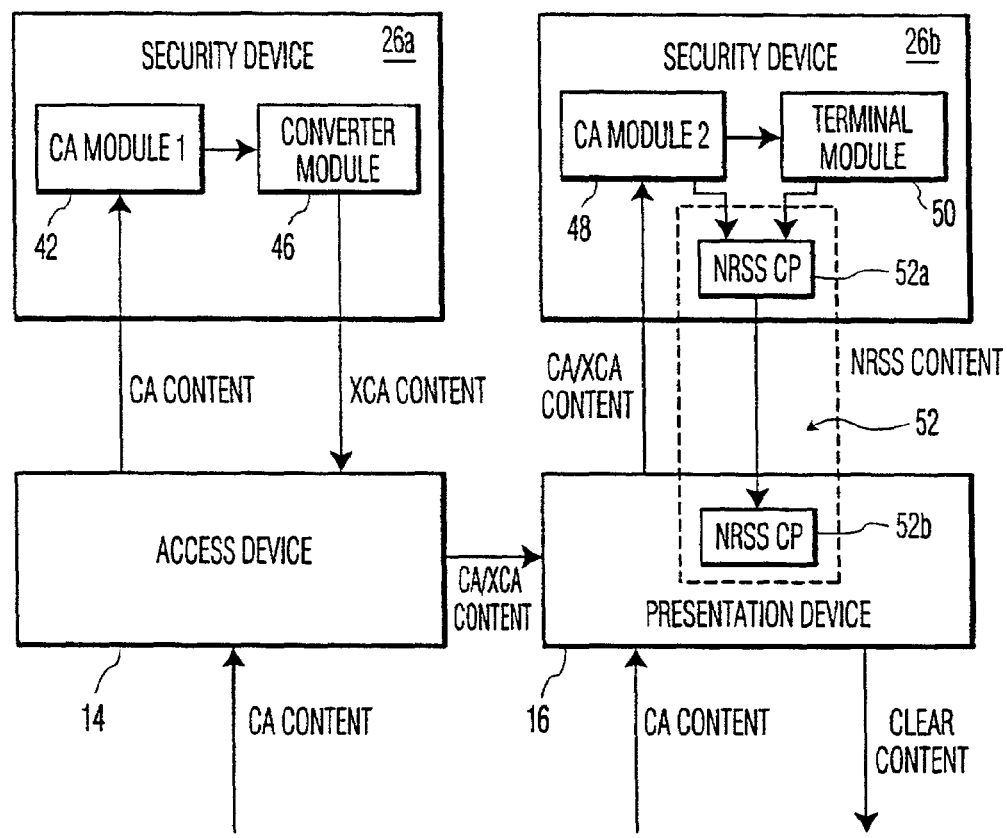
FIG. 5 is a block diagram illustrating the flow of content in accordance with the invention of FIG. 1.

Access devices typically operate in combination with an XCA/NRSS Converter Card (see 26a of FIG. 5). The XCA/NRSS converter card creates XCA protected content from private conditional access (CA) protected content or XCA globally protected content. Presentation devices, such as DTV 16, operate in combination with an XCA/NRSS Terminal Card (see 26b of FIG. 5) for descrambling XCA protected content. If a DTV is used as an access device as well as a presentation device, the DTV may operate with both a converter card 26a and a terminal card 26b or the functionality of both may be integrated into one card.

The XCA architecture can handle (1) clear content that is not protected by any means, e.g., broadcast programs, (2) CA content that is scrambled by a CA system using ECMs to carry the control words (CWs), e.g., digital satellite or cable services, (3) XCA content that is scrambled by XCA using Local ECMs (LECMs) to carry the CWs or keys (the LECMs are encrypted using the public key associated with access device 16), and (4) NRSS content that is scrambled by the XCA NRSS copy protection scheme. In addition, XCA content that is scrambled using Universal ECMs (UECMs) to carry the CWs may also be processed by this system. UECMs are encrypted using one unique global public key common to all networks and may be used, for example, for pre-recorded content.

The typical functions of an XCA device of FIG. 2 are described below. The digital input 24 comprises all the circuitry and software needed to acquire a digital signal. The digital input may be of the form of a digital bus (e.g., IEEE 1394), a telco, a LAN, RF VSB/QAM or the like. Similarly, the digital output 34 comprises all the circuitry and software needed to provide a digital signal and may be of the form of a digital bus (e.g., IEEE 1394), a telco, a LAN, RF VSB/QAM or the like.

Security device 26, whether renewable such as an NRSS card or embedded within a host device 20, handles CA functions and XCA functions and is able to transform the type of the content. Security device 26 may only be connected to a single XCA device at any one time and provides transformed content. The below table summarizes the permitted transformations.

| Signal In \ Signal Out | Clear    | CA       | XCA      | NRSS     |
|------------------------|----------|----------|----------|----------|
| Clear                  | Yes (T0) | No       | No       | No       |
| CA                     | Yes (T4) | Yes (T0) | Yes (T1) | Yes (T2) |
| XCA                    | Yes (T5) | No       | Yes (T0) | Yes (T3) |
| NRSS                   | No       | No       | No       | Yes (T0) |

The following transformations are applicable for both removable and embedded security devices:

T0 is the identity transformation, i.e., the output stream is exactly equal to the input stream. This allows card chaining.

T1 If the user has the right CA entitlements, then the security device recovers the CWs, and descrambles the content. It then generates the TDES keys, re-scrambles the content, and encrypts the LECMs using its public key. If the content source is an ATSC compatible system (i.e., TDES scrambling), descrambling may not be needed.

T2 If the user has the right CA entitlements, then the security device recovers the CWs, and descrambles the content. It then re-scrambles the content following the requirements of the XCA NRSS interface protection system, described below in further detail. The CA provider defines this transformation.

T3 If the user has the right XCA entitlements, then the security device descrambles the content using the CWs of the LECMs. It then re-scrambles the content following the requirements of the XCA NRSS interface protection system.

The following two transformations only apply to embedded security devices:

T4 If the user has the right CA entitlements, then the security device recovers the CWs, and descrambles the content. The CA provider defines this transformation.

T5 If the user has the right XCA entitlements, then the security device descrambles the content using the CWs of the LECMs.

A converter card supports at least transformation T1 and a terminal card supports at least transformation T3. In addition to the above requirements, if security device 26 is renewable and is capable of non-volatile storage of program content, then its storage shall not accept NRSS content. If security device 26 transforms content (e.g., scrambles/re-scrambles content or encrypts/reencrypts LECMs) then it shall conform to NRSS-A or NRSS-B. Finally, if security device 26 needs NRSS interface protection 35, then it shall use the XCA NRSS interface protection system, as referenced in EIA-679B (described below in further detail).

Storage unit 28 may either be fixed such as a hard drive or removable such as a recordable DVD, DVHS tape or the like. Storage unit 28 stores clear or XCA content and is able to replay the content later when requested by the system. That is, storage unit 28 is able to read, and optionally write, content; it does not transform the type of the content.

Presentation device 16, if necessary, descrambles 35 the NRSS copy protection stream and then decodes 36 the MPEG2 content. The descrambled and decoded content is then presented to the user in an analog form by passing the content through digital-to-analog converter 38. The final outcome may be a physical signal such as a TV display or analog output of a hi-fi amplifier. Presentation device 16 may have one or more analog outputs, or uncompressed digital outputs. In these cases, the output is protected by the relevant copy protection system.

Switching unit 22 routes content within the XCA device. Its function is limited to routing only; it does not transform the type of the content. The following table defines the different routing options depending on content format.

| Source \ Sink | | Digital Output 34 or Storage Device 28 | Security Device 26 (removable or embedded) | Presentation Device 16 |
|---|---|---|---|---|
| Digital Input | Clear | Yes | Yes | Yes |
| 24 or | Scrambled | Yes | Yes | NA[1] |
| Storage Device 28 | NRSS | No[2] | No[2] | No[2] |
| Security | Clear | Yes | Yes | Yes |
| Device 26 | Scrambled | Yes | Yes | NA[1] |
| (removable or embedded) | NRSS | No | Yes[3] | Yes |

[1]Sending scrambled content to the presentation unit has no meaning. The presentation unit is incapable of descrambling the data, and thus cannot make any use of it.
[2]NRSS data should not be accepted by digital input or storage units. Thus it cannot be sent to other parts of the device.
[3]NRSS data can be passed from one security device to another only for the purposes of 'daisy chaining'. The content can be passed through subsequent devices in the chain, but the keys (or NRSS CP secrets) must not be disclosed to any other device (including security devices).

Before accepting a public key used for generating the LECM (i.e., rebundling of the ECM), an access device must be assured it is getting a public key that is legitimate, that is one generated by an authorized entity. Certification is one way of providing this assurance. Access devices shall only provide XCA content using a certified public key. A public key certificate is a signed message, which associates the public key with an originating entity.

A unique local public/private key pair is assigned to security device 26 employed in the XCA architecture. There are two types of security devices: devices with a converter module and devices with a terminal module. Every converter and terminal module may be assigned a unique 64-bit identification and a unique RSA public/private key pair of 1024-bit length.

Figure 3:
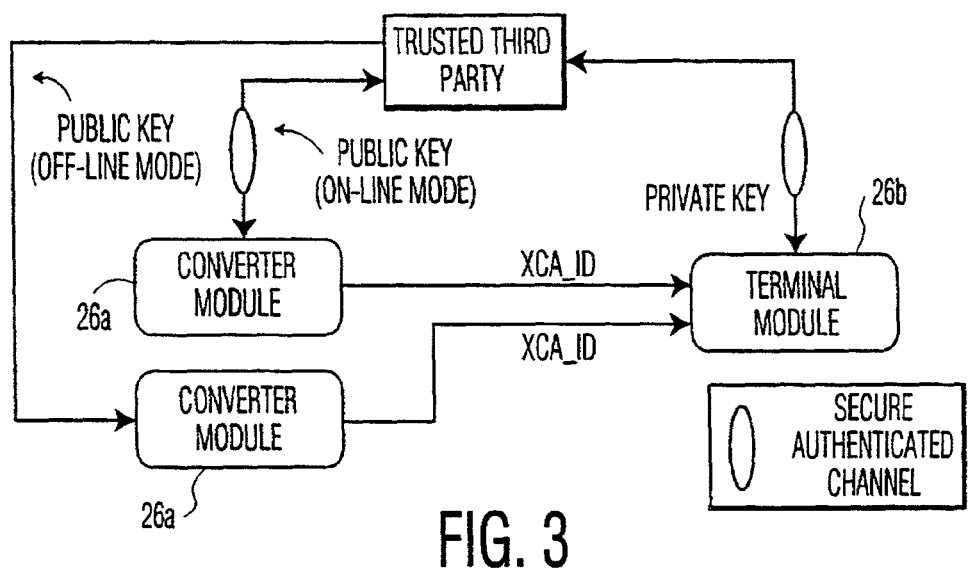
FIG. 3 illustrates a model for distributing the public and private keys in accordance with the invention of FIG. 1.

The model for distributing the public and private keys for the converter modules is illustrated in FIG. 3 wherein a Trusted Third Party (TTP), the CA provider itself or an independent organization, generates and keeps a copy of public/private keys in a database. The public key has to be in the converter module of the security device associated with the access device before any conversion takes place. The corresponding private key is downloaded to the terminal module when requested.

There are two modes for distributing public keys:

Off-line mode: in this mode, a set of XCA_IDs is delivered to the card issuer or card manufacturer. Each ID is paired with the corresponding public key. The card issuer or the card manufacturer stores this information in the security device in a way to ensure its integrity.

On-line mode: In this mode, only the XCA_IDs are delivered to the card issuer or card manufacturer. The XCA_ID is stored in the security device in a way to ensure its integrity. When first used in the field, the converter module requests its public key from the TTP. The transfer is made using the secure authenticated channel defined by the CA provider.

The TTP delivers the private key of a given converter module to a terminal module only in response to the request of this terminal module. The transfer shall use the secure authenticated channel defined by the CA provider. The terminal module shall ask for a private key of a given converter module when it receives a LECM from an unknown converter module. A converter module issues such a LECM at least at the beginning of each session. A session begins every time the access device delivers a content to a presentation device. The TTP has the responsibility to monitor the requests in order to detect malicious requests. The security policy associated with this task is determined by the CA provider as part of his risk analysis.

The communication between the converter/terminal modules 26a and 26b and the TTP will be under the control of the CA provider operating the XCA system. The TTP will select and implement appropriate communication channels and message protocols needed for key distribution. In implementing the XCA system, the CA provider may choose a particular communication channel or a private message protocol. The CA providers will need to collaborate and exchange data to ensure the interoperability of security devices in home networks. This need may arise if, for example, a converter card and a terminal are provided by different CA providers. When the terminal card requests the private key belonging to the converter card from the TTP, the TTP will have to obtain it from the CA provider that owns the converter card.

The keys for content descrambling are rebundled in LECMs by access device 14. That is, the encrypted ECMs, which carry the descrambling keys, are decrypted by access device 14 and then re-encrypted using a local public key associated with the access device to produce the LECM. Particularly, XCA system 10 achieves local security by only descrambling the content when it is to be viewed, for example, in conjunction with the local presentation device (e.g., digital television) 16. Private conditional access protects the transmission of the content from the service provider (i.e., tape, DVD or broadcast 11) to the user's access device 14. The XCA architecture protects the content in the local network.

Particularly, XCA operates on the philosophy that content should be encrypted at all times, including distribution and storage. Consider, for example, the delivery of premium programming from a multi-program video provider. Content is scrambled as it enters the home. The provider's private CA system is responsible for making available the content to the consumer according to the entitlements that have been agreed upon. In an ATSC-compliant digital delivery systems, the program is MPEG compressed and scrambled using the triple DES (TDES) algorithm. The keys for descrambling the program are contained in Entitlement Control Messages (ECMs) which themselves are encrypted in some private and unknown fashion. A consumer entitled to view the program must be handed either the descrambled transport stream or a scrambled transport stream with the keys necessary for descrambling when viewed. The first case does not provide for the protection of content.

Figure 4:
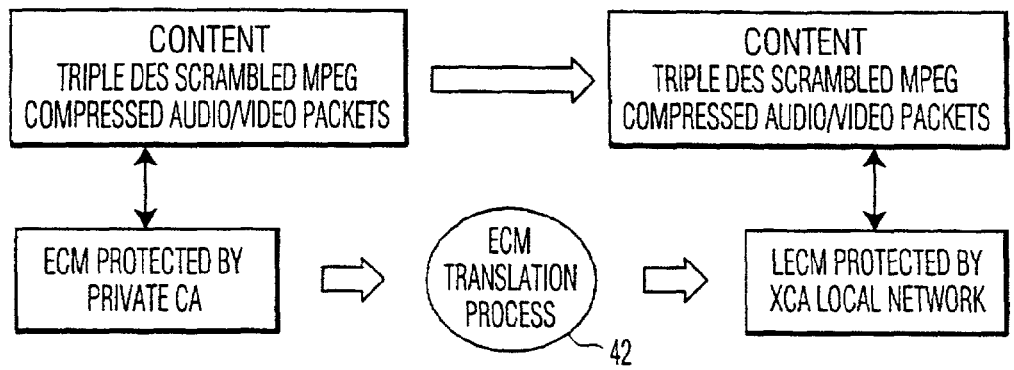
FIG. 4 is a block diagram illustrating the generation of an LECM in accordance with the invention of FIG. 1.

As shown in FIG. 4, XCA protects the content on the local network by rebundling (i.e., ECM translation) 42 the keys required for descrambling (i.e., the TDES keys) into a new ECM which is protected by a local public key associated with the access device (i.e., LECM). This process is typically performed in access device 14 and preferably in security device 26. In this fashion, the only device capable of recovering the TDES keys and hence descrambling the MPEG program is the local presentation device, e.g., DTV. Because every local network contains a unique set of public/private key pairs, only the local system which recorded or viewed the original content is capable of viewing any copies derived from its local network distributed content. Even if a rogue device making non-legitimate and unauthorized copies exists, they are viewable only within the local network.

The flow of content with the XCA domain is further explained using FIG. 5. The CA and XCA functionality can be optionally removed from the access device and placed in a special security device 26, known as a converter card 26a. Likewise, a terminal card 26b can optionally assume the CA, XCA and NRSS functionality (i.e., the security aspects) of presentation device 16. Particularly the flow of content within the XCA domain involves passing incoming CA content from access device 14 to CA module 44 of security device 26a. CA module 42 recovers the control words (CW) or keys for the CA content and passes the CWs to converter module 46 which generates the necessary LECM. Converter module 46 passes XCA protected content back to access device 14 which in turn passes the XCA protected content to presentation device 16. The XCA protected content is passed to security device 26b, particularly to terminal module 50 via CA Module 48. Terminal module 50 recovers the CW from the LECM and descrambles the XCA protected content. The clear content is now passed to NRSS CP module 52; both the NRSS CP module 52 and presentation device 16 participate to generate the scrambling key. The scrambling key is usually a symmetric key, but other approaches using a public key may be employed. The functionality of NRSS CP module 52 is shared by security device 26b (represented as 52a) and presentation device 16 (represented by 52b). NRSS CP module 52 scrambles, preferably using DES, the content using this scrambling key and then passes the scrambled content to NRSS CP module 52b in presentation device 36. NRSS CP module 52b descrambles the scrambled content for display.

Figure 6:
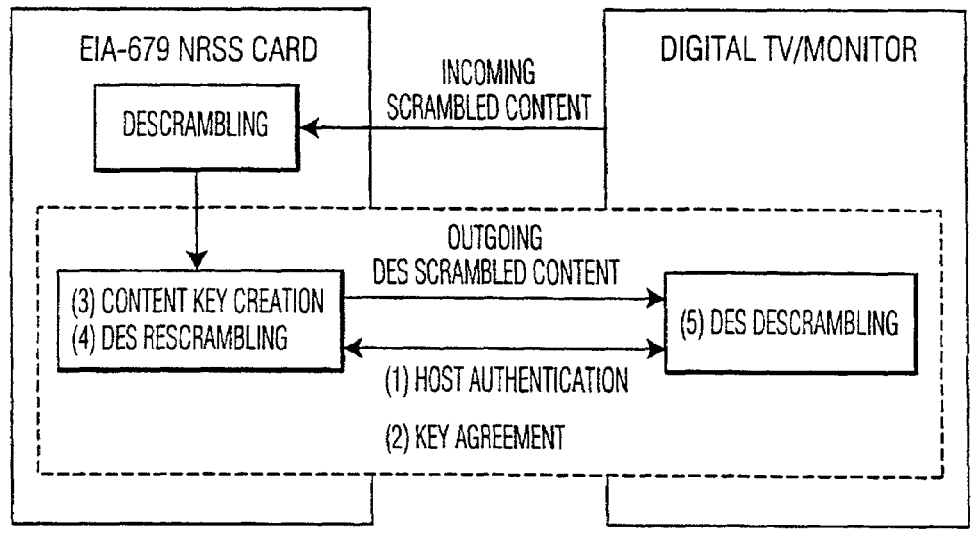
FIG. 6 is a schematic diagram illustrating the protection of the NRSS interface in accordance with the invention of FIG. 1.

In XCA systems, both real-time and pre-recorded content remains scrambled throughout the system. The XCA presentation device 16 using the copy protection system as defined by EIA-679 and EIA-796 accomplishes final descrambling. In this fashion, copy protection management is provided end-to-end, that is, from the source of scrambling to the final viewing display. As is illustrated in FIG. 6, XCA protects the NRSS interface by rescrambling the content using single DES with keys generated randomly between the presentation device and the NRSS card. Known as the Diffie-Hellman key agreement, this protocol ensures a third party cannot recover the keys simply by tapping the smart card interface.

Particularly, the protection of the NRSS interface is based on three primary principles. Firstly, restricting the devices that may receive copy protected data by requiring a license. Secondly, scrambling data and protecting the keys so those passive devices cannot record signals and decode a clear bit stream. Finally, coupling the host presentation devices and terminal cards and authenticating the host devices so those active devices to record bit streams are difficult to create.

Therefore in general, the procedure for establishing an XCA protected NRSS link involves: (1) authenticating the presentation host device, (2) establishing a shared secret key that is unique to a particular presentation device/terminal card pair, (3) creating content protection keys (e.g., shared keys) in real time, (4) scrambling content returning to the host (e.g., DTV) with DES, and (5) descrambling content received by the host. These steps are illustrated in FIG. 6.

Every XCA presentation device will be manufactured with a unique ID. This ID can be used to identify the manufacturer and a specific XCA presentation device. These ID's are warranted by the manufacturer to be unique, but are not certified or secure in any way. This allows a host to be uniquely identified for the purpose of security, yet makes device revocation virtually impossible to manage. Forging an apparently valid ID is very simple, but security methods outlined below eliminate any significant value in doing so.

Figure 7:
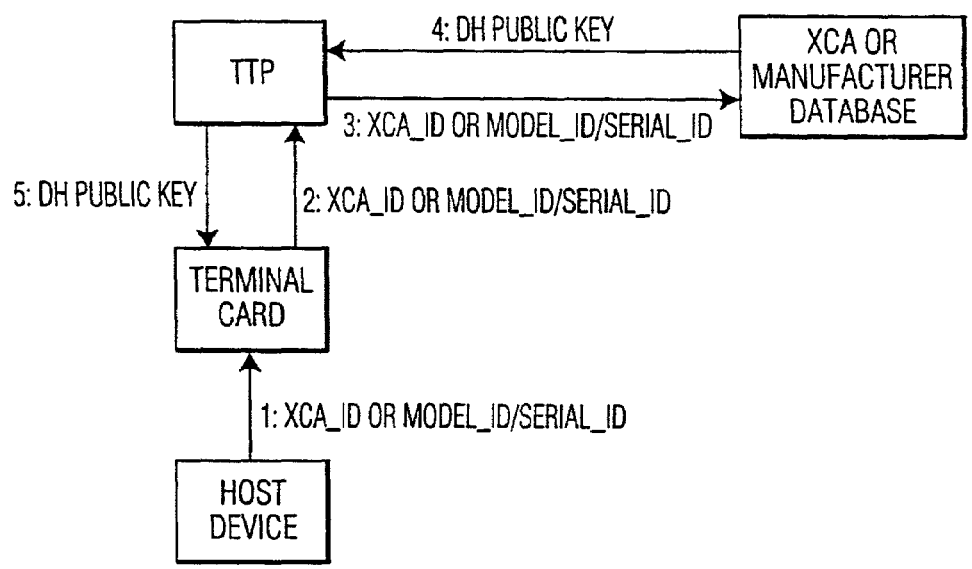
FIGS. 7 and 8 are schematic diagrams for creating secure authenticated links in accordance with the invention of FIG. 1.
Figure 8:
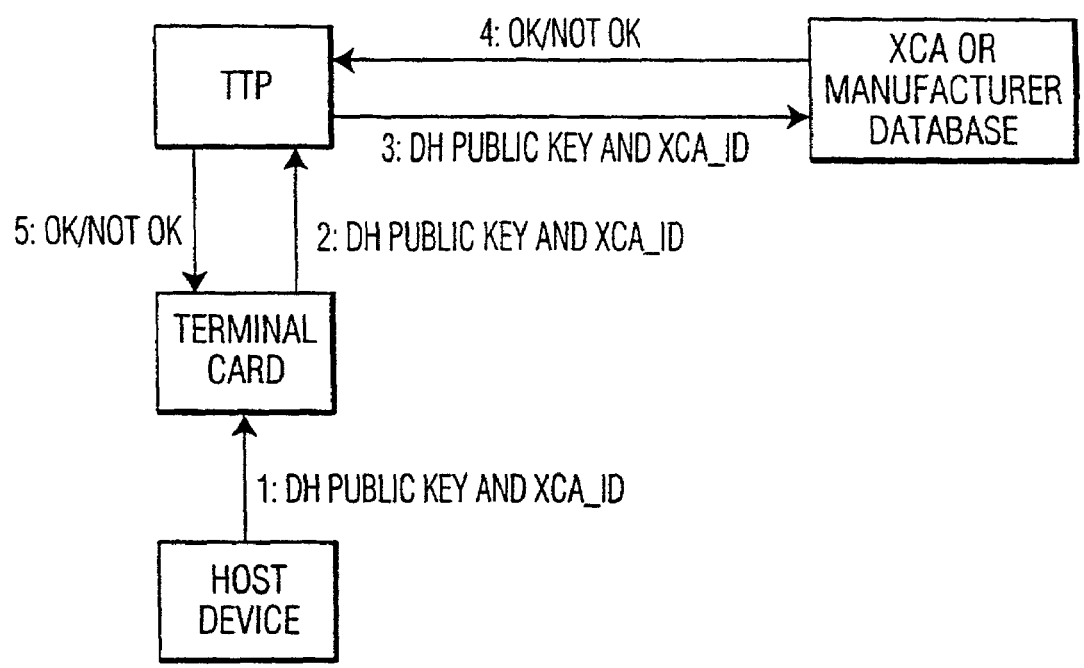

NRSS based terminal cards can create a secure authenticated link with a presentation device by communicating with a trusted third party (TTP). Either the device ID or the model and serial number can be used to get the correct DH public key for a given host. In this scheme, as illustrated in FIG. 7, the ID/serial number is sent to the TTP (steps 1 and 2). The TTP queries its manufacturers database for this host (step 3), determines the correct public key for this XCA Presentation Device (step 4), and sends some private authentication to the CA module via a secure channel (step 5). Alternatively as illustrated in FIG. 8, the card can request the public key from the host device (step 1) and send it to the CA head-end or TTP for authentication and storage (step 2). Many feasible communications messages and channels exist. Possibilities for communications channels are phone lines, return path communications, sending an EMM over a distribution network, or even shipping a physical unit.

The only devices allowed to use the XCA NRSS copy protection system outlined here are devices that do not have (1) a digital input that can receive data from the NRSS interface or (2) any means for mass storage that can receive data from the NRSS interface.

A shared secret shall be established between any given pair of a presentation device and a terminal card. At the terminal card's option, a single shared secret value can be used for all sessions, or, if additional security is desired, a new-shared secret can be created for each session. The procedure for secret creation is outlined in the copy protection framework for NRSS (EIA-6796 part A section 20.3, or part B section 8.9.3). Control words for protecting content travelling across the NRSS interface shall be created according to the NRSS standard (EIA-679B part A section 20.5, or part B section 8.9.5).

The interval for updating NRSS content scrambling keys is the same as the interval for updating content scrambling keys in local network packets. The update rate in local network packets can be found using source_sequence_number in section. At each new source_sequence_number, a new NRSS key should be put into use. If the new key is the EVEN key in a negotiated pair, then a new negotiation should be started at the same time the new key is used. If this negotiation does not conclude before the next increment to source_sequence_ number, then the terminal card should stop providing NRSS content because the host is not behaving properly. This requires that hosts (and cards) must be able to complete the key negotiation in less than 900 mS.

Content being scrambled for protection over the NRSS interface shall conform to the NRSS standard (EIA-2679B part A sections 20.5.3 and 20.5.4, or part B sections 8.9.5.3 and 8.9.5.4). All packets in the main video stream and primary audio streams (that are actively in use) shall be scrambled.

XCA uses EIA-679A copy protection Format #1 with the below-defined field sizes.

| datatype_id | id value | Size (bytes) |
|---|---|---|
| Host_id | 05 | 8 |
| N_host | 07 | 8 |
| N_module | 08 | 8 |
| Host DH Public Key | 13 | 96 |
| Module DH Public Key | 14 | 96 |
| CCI | 18 | 8 |

All the CA systems that will be used in ATSC broadcast systems are assigned unique CA_system_IDs. Likewise, XCA uses a unique CA_system_ID to perform local conversion. The value chosen for XCA is 0x180. The broadcasters shall include this ID in their list of CA providers. During the transmission of content, an unused PID shall be allocated for XCA LECMs. Each program that needs to be converted to XCA shall appear in a PMT, which includes the XCA_system_ID pointing to the allocated LECM PID. Empty packets with the LECM PID do not need to be inserted in the broadcast transport stream as the CA ECMs will be replaced by LECMs in the conversion process.

The MPEG2 transport stream consists of transport packets as shown below.

| Syntax | No. of bits | Mnemonic |
|---|---|---|
| MPEG2_transport_stream( ) { | | |
|   do { | | |
|     transport_packet( ) | | |
|   } while (nextbits( ) == sync_byte) | | |
| } | | |

Transport packets that are protected under XCA security are scrambled using Triple-DES, as per ATSC specifications on conditional access. The PIDs carrying both non-local ECMs and local ECMs (LECMs) shall be specified by the Program Map Table defined in the MPEG2 standard.

The local ECM tables shall be packet aligned with the syntax defined below.

| Syntax | No. of bits | Mnemonic |
|---|---|---|
| LECM_transport_packet( ) { | | |
|   sync_byte | 8 | bslbf |
|   transport_error_indicator | 1 | bslbf |
|   payload_unit_start_indicator | 1 | '1' |
|   transport_priority | 1 | bslbf |
|   PID | 13 | uimsbf |
|   transport_scrambling_control | 2 | '00' |
|   adaptation_field_control | 2 | '01' |
|   continuity_counter | 4 | uimsbf |
|   pointer_field | 8 | uimsbf |
|   for (i= 1; i< 184; i+ +) { | | |
|     data_byte | 8 | uimsbf |
|     { | | |
|   } | | |
| } | | | wherein:
sync_byte—A fixed 8-bit field whose value is '0x47'.
transport_error_indicator—A 1-bit flag. When set to '1', it indicates that there is at least one uncorrectable bit error in the packet.

payload_unit_start_indicator—This 1-bit flag shall be set to '1', and the first byte of the payload of this transport stream packet shall carry a pointer_field.

transport_priority—A 1-bit flag. When set to '1', it indicates that the packet is of greater priority than the other packets having the same PID which do not have the bit set to '1'.

PID—A 13-bit packet identifier.

transport_scrambling_control—This 2-bit field shall be set to '00', meaning that the packet is not scrambled at the transport level.

adaptation_field_control—This 2-bit field shall be set to '01', meaning that there is no adaptation field following the transport stream packet header.

continuity counter—A 4-bit field that increments with each transport stream packet with the same PID. It wraps around to 0 after it reaches its maximum value.

pointer_field—This 8-bit field contains the number of bytes, immediately following the pointer field until the first byte of the first section that is present in the payload of the transport stream packet. A value of 0x00 indicates that the section starts immediately after the pointer field.

data_byte—Contiguous 184 bytes of data from Local Entitlement Control Message sections or packet stuffing bytes after Local Entitlement Control Message sections. Packet stuffing bytes of value 0xFF may be found after the last byte of a section. In this case, all following bytes until the end of the packet shall also be stuffing bytes of value 0xFF.

The Local Entitlement Control Message may comprise one or more sections each of, which may be variable in length. The LECM may comprise at least the (1) the XCA device identification of the security device that generated the LECM, (2) copy control information which may be used to enforce viewing rights, and (3) the descrambling keys.

While the invention has been described in detail with respect to numerous embodiments thereof, it will be apparent that upon reading and understanding of the foregoing, numerous alterations to the described embodiment will occur to those skilled in the art and it is intended to include such alterations within the scope of the appended claims.

The invention claimed is:

1. A method for managing access to a scrambled program, within a network comprising a first device and a second device, the method comprising:
   (a) receiving, from a service provider, said scrambled program in said first device, said scrambled program comprising a scrambled data component and an encrypted descrambling key;
   (b) rebundling, in said first device, said descrambling key using a unique key associated with said first device, wherein said first device is an access device;
   (c) receiving, in said second device, said scrambled data component and said rebundled descrambling key, wherein said second device is a terminal device interconnected to said access device;
   (d) obtaining in said second device said descrambling key from said rebundled descrambling key; and
   (e) descrambling, in said second device, said scrambled data component using said descrambling key.

2. The method of claim 1 wherein said descrambling key is encrypted and the step of rebundling comprises:
   (a) decrypting said encrypted descrambling key using a key associated with said scrambled program; and
   (b) re-encrypting said descrambling key using said unique key associated with said first device to produce said rebundled descrambling key.

3. The method of claim 2 wherein said unique key associated with said first device is a public key, said public key being located in said first device and a corresponding private key being located in said second device.

4. The method of claim 2 wherein the step of rebundling is performed within a first smart card coupled to said first device and the steps of obtaining and descrambling are performed within a second smart card coupled to said second device.

5. The method of claim 1 further comprising the step of initializing said first device within said network.

6. The method of claim 5 wherein the step of initializing comprises the step of receiving a public key from a conditional access provider, said step of receiving comprising authentication of said conditional access provider.

7. The method of claim 5 wherein a public key is prestored in a smart card coupled to said first device or in said first device.

8. The method of claim 1 wherein said descrambling key is encrypted using a private means if said scrambled program is received from pre-recorded media or protected by a private means if said scrambled program is received from a service provider.

9. The method of claim 1, wherein the second device is a presentation device.

10. A method for managing access to a scrambled program received from a service provider within a network having an access device and a presentation device, said method comprising:
   (a) receiving said scrambled program from the service provider in an access device, said scrambled program comprising a scrambled data component and an encrypted descrambling key;
   (b) decrypting, in said access device, said encrypted descrambling key using a key associated with said service provider;
   (c) re-encrypting said descrambling key, in said access device, using a public key associated with said access device;
   (d) receiving, in said presentation device interconnected to said access device, said scrambled data component and said re-encrypted descrambling key and descrambling at said presentation device, said scrambled data component by using said descrambling key, which is decrypted at said presentation device.

11. An access device, comprising:
   a signal input for receiving a scrambled program from a service provider, the scrambled program including a scrambled data component and an encrypted descrambling key;
   a decrypting unit, in said access device, for obtaining the descrambling key using a key associated with the scrambled program of the service provider;
   an encryption unit, in said access device, for re-encrypting the descrambling key using a public key associated with the access device;
   a signal output coupled to a digital bus for transmitting the scrambled data component and the re-encrypted descrambling key to a presentation device interconnected to said access device via the digital bus, wherein only a presentation device having a corresponding private key is able to decrypt the re-encrypted descrambling key and descramble the scrambled content.

12. The access device of claim 11, wherein the public key is periodically received from a conditional access provider.

13. The access device of claim 11, wherein the signal output authenticates the presentation device before transmitting the scrambled data component and the re-encrypted descrambling key to the presentation device.

14. The access device of claim 11, wherein the signal output transmits identification data associated with the access device and copy control information along with the re-encrypted descrambling key.

15. A method for processing program signal in an apparatus coupled to an access device in a local network, comprising the steps of:
- receiving, from the access device that is coupled to a service provider, a signal comprising the program signal and a descrambling key in scrambled form, the descrambling key being re-encrypted by the access device using key information associated with the access device;
- decrypting, in a terminal device interconnected to said access device, the re-encrypted descrambling key using said key information associated with the access device to obtain the descrambling key;
- descrambling the program signal using the decrypted descrambling key at said terminal device.

16. The method according to claim 15, wherein the key information corresponds to entitlement control messages, and further comprising the step of obtaining a descrambling key from the entitlement control messages, and the descrambling step comprises descrambling the program signal using the descrambling key.

17. The method according to claim 15, wherein
- the descrambling information is re-encrypted using a private key associated with the access device, and the decrypting step comprises decrypting the descrambling information using a public key associated with the access device.

18. The method according to claim 15, further comprising the steps of:
- transmitting authentication information to the access device; and
- receiving key information associated with the access device from the access device following the transmission of the authentication information.

* * * * *